United States Patent
Yoneda et al.

(10) Patent No.: US 7,393,821 B2
(45) Date of Patent: *Jul. 1, 2008

(54) DETERGENT BUILDER AND DETERGENT COMPOSITION

(75) Inventors: Atsuro Yoneda, Toyonaka (JP); Yoshikazu Fujii, Suita (JP); Shigeru Yamaguchi, Yao (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 223 days.

This patent is subject to a terminal disclaimer.

(21) Appl. No.: 10/962,545

(22) Filed: Oct. 13, 2004

(65) Prior Publication Data

US 2005/0101513 A1    May 12, 2005

(30) Foreign Application Priority Data

Oct. 14, 2003  (JP) .............................. 2003-353944

(51) Int. Cl.
*C11D 3/37* (2006.01)
*C11D 1/00* (2006.01)

(52) U.S. Cl. ...................... 510/499; 510/276; 510/360; 510/475; 510/480; 510/531; 510/533; 526/217; 526/307; 524/4

(58) Field of Classification Search ................. 510/276, 510/360, 475, 480, 499, 531, 533; 526/217, 526/307; 524/4

See application file for complete search history.

(56) References Cited

U.S. PATENT DOCUMENTS

| 4,897,220 A | 1/1990 | Trieselt et al. |
| 6,864,337 B2 | 3/2005 | Yuasa et al. |
| 2002/0193547 A1* | 12/2002 | Yuasa et al. ................ 526/312 |

FOREIGN PATENT DOCUMENTS

| EP | 0 111 976 A2 | 6/1984 |
| EP | 0291808 | 11/1988 |
| EP | 1 361 233 A1 | 11/2003 |
| JP | 63-091130 | 4/1988 |
| JP | 11 269239 A | 10/1999 |
| JP | 11-269239 A | 10/1999 |
| JP | 2000 063164 | 2/2000 |
| JP | 2003-128738 | 5/2003 |
| JP | 2003-286344 | * 10/2003 |
| WO | WO 99/67353 | * 12/1999 |
| WO | WO-02/053611 A1 | 12/2001 |

* cited by examiner

*Primary Examiner*—Brian P Mruk
(74) *Attorney, Agent, or Firm*—Connolly Bove Lodge & Hutz, LLP

(57) ABSTRACT

It is an object of the present invention to provide a detergent builder comprising a copolymer excellent in compatibility with a liquid detergent and capable of exhibiting excellent basic abilities such as prevention of recontamination and detergency ratio, and a detergent composition containing the detergent builder. The above-mentioned detergent builder comprises a copolymer obtained by copolymerization of monomer components containing a polyalkyleneimine unsaturated monomer and other monomers.

14 Claims, No Drawings

DETERGENT BUILDER AND DETERGENT COMPOSITION

TECHNICAL FIELD

The present invention relates to a detergent builder. More particularly, the present invention relates to a detergent builder comprising a copolymer suitable for a builder for detergents and exhibiting high cleaning power in the case of use as a builder for detergents together with a surfactant, and a detergent composition comprising the detergent builder.

BACKGROUND ART

A polyalkyleneimine-alkyleneoxide adduct comprising a polyalkyleneimine as a main chain and an alkyleneoxide such as ethylene oxide added to a nitrogen atoms of the polyalkyleneimine is efficient to exhibit a function as a polymer builder. Such a polymer is soluble in a liquid detergent, so that it has become an essential ingredient composing a liquid detergent. If a polyalkyleneimine-alkyleneoxide adduct and a surfactant are added together to a detergent recontamination by stains removed by cleaning can be prevented and the detergent exhibits high cleaning power.

As the polyalkyleneimine-alkyleneoxide addition copolymer, polycarboxylic acid copolymers obtained by copolymerizing a polyalkyleneimine unsaturated monomer (A1) and an unsaturated carboxylic acid monomer (B) are disclosed in Japan Kokai publication No. 2003-128738 (page 1). With respect to the polycarboxylic acid-based copolymers, the repeating unit composed of the polyalkyleneimine unsaturated monomer (A1) has a function of making the water-reducing property and the workability of cement compositions or the like excellent and the repeating unit composed of the unsaturated polycarboxylic acid-based monomer (B) has a function of making the polycarboxylic acid copolymer absorbable in cement particles, and use of such a polycarboxylic acid copolymer as a component of a cement additive makes the water-reducing property and workability of cement compositions excellent and also makes the hardened products of the compositions excellent in the strength and durability. However, use of the copolymer as a polymer builder for detergents or the like is not disclosed and thus there was a room for contrivance in this point.

SUMMARY OF THE INVENTION

It is an object of the present invention, which has been made in view of the above-mentioned state of the art, to provide a detergent builder comprising a copolymer excellent in compatibility with a liquid detergent and capable of exhibiting excellent basic abilities such as prevention of recontamination and detergency ratio, and a detergent composition containing the detergent builder.

In the course of investigations made by them in search of copolymers suitable for uses such as a detergent builder, the present inventors have paid attention to that, for example, copolymers obtained by causing a reaction of an epoxy compound having polymerizable double bond such as allyl glycidyl ether with terminal hydroxyl groups of a polyalkyleneimine-alkyleneoxide adduct for obtaining a micromere and copolymerizing the reaction product with a monomer such as (meth) acrylic acid are excellent in compatibility (solubility) with a liquid detergent and exhibiting excellent functions of preventing recontamination and high detergency ratio. Consequently, the inventors have found that use of a copolymer obtained by copolymerizing monomer components comprising a polyalkyleneimine unsaturated monomer and other monomers as the detergent builder makes it possible to provide high basic abilities. Such a copolymer is supposed to adhere to the surface of a cloth such as cotton by the cation derived from polyalkyleneimine, and in this case, for example, attributed to the steric structure of the polyalkyleneimine-alkyleneoxide adduct, the stains such as mud are prevented from redeposition (reattachment) and at the same time, owing to the structure formed by other monomers, the stains such as mud are repelled to result in improvement of the effect of redeposition prevention. Further, the inventors have also found that when a (meth) acrylic acid monomer is copolymerized, dispersibility of the stains is improved by carboxyl group and the like derived from the monomer and it is useful for the use as the detergent builder and accordingly, the inventors have come to a conclusion that the above-mentioned problems can be solved well and thus have accomplished the present invention.

That is, the present invention is a detergent builder comprising a copolymer obtained by copolymerization of monomer components containing a polyalkyleneimine unsaturated monomer and other monomers.

DETAILED DISCLOSURE OF THE INVENTION

In the following, the present invention is described in detail.

The polyalkyleneimine unsaturated monomer of the present invention may be any polyalkyleneimine unsaturated monomer having a polymerizable unsaturated group and, for example, it can be obtained by reaction of polyalkyleneimine with an unsaturated compound having a functional group reactive on the amino group or imino group of the polyalkyleneimine. In the invention, the polyalkyleneimine unsaturated monomer is preferable to have an oxyalkylene group. Use of a copolymer obtained from using such a polyalkyleneimine unsaturated monomer having an oxyalkylene group provides the function of preventing redeposition (re-adhension) of stains to a cloth such as cotton owing to the steric structure of the polyalkyleneoxide chain.

The above-mentioned polyalkyleneimine unsaturated monomer having an oxyalkylene group may be polyalkyleneimine having an unsaturated group and the oxyalkylene group and it can be obtained by causing reaction of a compound obtained by adding alkyleneoxide to nitrogen atom of the amino group or imino group of the polyalkyleneimine with an unsaturated compound having a functional group reactive on the hydroxyl, amino, or imino of the compound. A monomer with a high molecular weight such a polyalkyleneimine unsaturated monomer having an oxyalkylene group is called as a macromer. The nitrogen atom of the amino group or imino group to which the alkyleneoxide is to be added has an active hydrogen atom.

In the case of obtaining the above-mentioned polyalkyleneimine unsaturated monomer having an oxyalkylene group, as a method for introducing an unsaturated group into the compound obtained by adding the alkyleneoxide to the polyalkyleneimine, preferable methods are a method for introducing the unsaturated group by ester interchange of hydroxyl of the compound obtained by addition of the alkyleneoxide to polyalkyleneimine with an unsaturated compound such as (meth) acrylic acid and (meth) acrylic acid alkyl ester; a method for introducing the unsaturated group by amidation of amino group of the compound obtained by addition of the alkyleneoxide to polyalkyleneimine with an unsaturated compound such as (meth) acrylic acid and (meth) acrylic acid alkyl ester; and a method for introducing the unsaturated group by reaction of hydroxyl of the compound obtained by addition of the alkyleneoxide to polyalkyleneimine with an epoxy compound such as glycidyl(meth) acrylate and (meth) allyl glycidyl ether.

Preferable examples of the above-mentioned polyalkyleneimine include homopolymers and copolymers obtained by common polymerization of one or more alkyleneimines having 2 to 8 carbon atoms such as ethyleneimine, propyleneimine, 1,2-butyleneimine, 2,3-butyleneimine, 1,1-dimethylethyleneimine and the like. They may be used alone or two or more species of them may be used in combination. The polyalkyleneimine chain of the polyalkyleneimine unsaturated monomer is formed from such polyalkyleneimine chain and the polyalkyleneimines may have any structure, e.g., a straight chain structure, a branched structure, and a three-dimensional crosslinked structure. Further, they may be ethylenediamine, diethylenetriamine, triethylenetetramine, tetraethylenepentamine and the like. Such a polyalkyleneimine generally has a primary amino group and a secondary amino group (imino group) having an active hydrogen atom, as well as tertiary amino group in the structure.

Preferable examples of the above-mentioned unsaturated compound include unsaturated carboxylic acids such as (meth) acrylic acid, maleic acid, fumaric acid, and citraconic acid; unsaturated carboxylic acid anhydrides such as (meth) acrylic anhydride and maleic anhydride; unsaturated carboxylic acid halides such as (meth) acrylic acid chloride; unsaturated carboxylic acid esters such as (meth) acrylic acid alkyl ester having 1 to 30 carbon atoms and maleic acid monoester having 1 to 30 carbon atoms; and epoxy compounds such as glycidyl (meth) acrylate and (meth) allyl glycidyl ether. They may be used alone or two or more of them may be used in combination. Among these, epoxy compounds such as glycidyl (meth) acrylate and (meth) allyl glycidyl ether are preferable and allyl glycidyl ether is more preferable.

Preferable examples of the alkyleneoxide to be added to the above-mentioned polyalkyleneimine include alkyleneoxides having 2 to 8 carbon atoms such as ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide, and octylene oxide; and, aliphatic epoxides such as dipentane ethylene oxide, and dihexane ethylene oxide; alicyclic epoxides such as trimethylene oxide, tetramethylene oxide, tetrahydrofuran, tetrahydropyran, and octylene oxide; and aromatic epoxides such as styrene oxides, and 1,1-diphenylethylene oxide. They may be used alone or two or more of them may be used in combination.

The reaction process shown as follows is one example of the reaction process to obtain the above-mentioned polyalkyleneimine unsaturated monomer having an oxyalkylene group by synthesizing polyethyleneimine from ethyleneimine using an initiator; obtaining polyethyleneimine-ethylene oxide adduct by adding ethylene oxide to nitrogen atom(s) having active hydrogen atom(s) of the polyethyleneimine; and introducing an unsaturated group by reaction of allyl glycidyl ether to the terminal hydroxyl (—OH) derived from the alkyleneoxide. Also, there is a process of adding ethylene oxide to the nitrogen atoms having active hydrogen atoms of the polyethyleneimine after the synthesis of the polyethyleneimine for obtaining polyethyleneimine-ethylene oxide adduct and then reacting of glycidyl methacrylate to the obtained adduct.

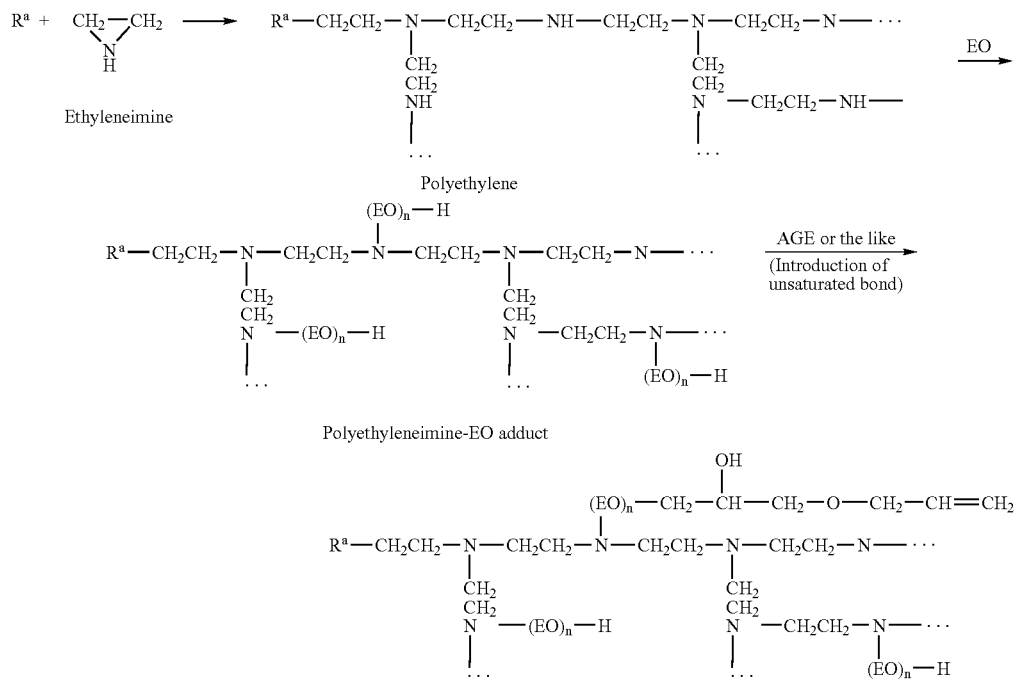

In the above-mentioned reaction formula, $R^a$ represents an initiator; EO represents ethylene oxide; $-(EO)_n-H$ represents addition of ethylene oxide in number of n to the nitrogen atoms having active hydrogen atoms in the polyethyleneimine; AGE represents allyl glycidyl ether. In the chemical formula s, the symbol " . . . " means similarly continued polymer chains.

The above-mentioned polyalkyleneimine unsaturated monomer comprises the polyalkyleneimine chain and such a polyalkyleneimine chain is preferably formed as a main portion. In this case, "main portion" means that the polyalkyleneimine occupying the most portion on the basis of the number of mol of the total alkyleneimines in the case the polyalkyleneimine chain is composed of two or more different alkyleneimines. In the present invention, with respect to the alkyleneimine for composing the polyalkyleneimine chain, if ethyleneimine occupies the most portion, the copolymer to be obtained is provided with improved hydrophilicity and sufficiently exhibits the functions and therefore, use of ethyleneimine as the alkyleneimine composing the polyalkyleneimine chains to the extent that the functions can sufficiently be drawn means that ethyleneimine occupies "the most portion" and thus ethyleneimine can form "the main portion".

With respect to the above-mentioned alkyleneimine composing the polyalkyleneimine chain, in the case of expressing the above "occupying the most portion" on the basis of mol % of the ethyleneimine group in 100 mol % of the total alkyleneimine, it is preferably 50 to 100 mol %. If it is less than 50 mol %, the hydrophilicity of the polyalkyleneimine chain is possibly decreased. It is more preferably 60 mol % or more, still more preferably 70 mol % or more, particularly preferably 80 mol % or more, and most preferably 90 mol % or more.

In the above-mentioned polyalkyleneimine unsaturated monomer, the average polymerization number of the alkyleneimine per one polyalkyleneimine chain is preferably 2 or more and 300 or less. If it is less than 2, the function of the polyalkyleneimine unsaturated monomer is not possible to be exhibited sufficiently and if it exceeds 300, the polymerization-ability of the polyalkyleneimine unsaturated monomer is possibly decreased. It is more preferably 3 or more. Also, it is more preferably 200 or less, still more preferably 100 or less, particularly preferably 75 or less, and most preferably 50 or less. In this case, the average polymerization number of diethylenetriamine is 2, the number of triethylenetetramine is 3.

In the above-mentioned polyalkyleneimine unsaturated monomer having an oxyalkylene group, the monomer comprises a group formed from one oxyalkylene group or a group formed by addition of two or more of oxyalkylene groups. The group formed by addition of two or more of oxyalkylene groups is formed from two or more species of oxyalkylene groups, and when forming from two or more species of oxyalkylene groups, two or more species of oxyalkylene groups may be added by random addition, block addition, or reciprocal addition. In the case a plurality of groups formed from the oxyalkylene group exists in one molecule, they may be same or different from one another. Additionally, the group formed by adding two or more oxyalkylene groups may be called also as a polyalkylene glycol chain.

The above-mentioned group formed from an oxyalkylene group is preferable to be a group comprising oxyethylene group as a main portion. In this case, "the main portion" means same as described above that oxyethylene group occupies the most portion on the basis of the number of mol of the total oxyalkylene groups in the case two or more different oxyalkylene groups exist in the monomer. Accordingly, the hydrophilicity of the polycarboxylic acid copolymer is improved and the function can sufficiently be exhibited.

With respect to the above-mentioned oxyalkylene groups, in the case of expressing the above "occupying the most portion" on the basis of mol % of an oxyethylene group in 100 mol % of the total oxyalkylene groups, it is preferably 50 to 100 mol %. If it is less than 50 mol %, the hydrophilicity of the group composed of the oxyalkylene groups is possibly decreased. It is more preferably 60 mol % or more, still more preferably 70 mol % or more, particularly preferably 80 mol % or more, and most preferably 90 mol % or more.

In the above-mentioned polyalkyleneimine unsaturated monomer having oxyalkylene groups, it is preferable that the average molar number of addition of the oxyalkylene groups is 0 to 300. If it exceeds 300, the polymerization-ability of these monomers may be decreased. It is more preferably 0.3 or more, still more preferably 0.5 or more, particularly preferably 1 or more, and most preferably 2 or more. Also, it is more preferably 270 or less, still more preferably 250 or less, particularly preferably 220 or less, and most preferably 200 or less. If the average molar number of addition of the oxyalkylene groups in the polyalkyleneimine unsaturated monomer is out of the above-mentioned ranges, the function of the polycarboxylic acid copolymer may be not exhibited sufficiently. The average molar number of addition means the average values of the molar number of the oxyalkylene groups added per one mol of the group composed of the oxyalkylene groups in the polyalkyleneimine unsaturated monomer or the average values of the molar number of the oxyalkylene groups added per one mol of nitrogen atom having active hydrogen atoms of the polyalkyleneimine composing the polyalkyleneimine unsaturated monomer. Furthermore, the polyalkyleneimine unsaturated monomer of 0 as the above-mentioned average molar number of addition comprises no oxyalkylene.

The weight average molecular weight of the above-mentioned polyalkyleneimine unsaturated monomer is preferably 500 or more and 500000 or less. It is more preferably 1000 or more, still more preferably 5000 or more, particularly preferably 8000 or more, and most preferably 10000 or more. Also, it is more preferably 300000 or less, still more preferably 200000 or less, even more preferably 100000 or less, and particularly preferably 80000 or less.

Other monomers in the present invention may be monomer other than the polyalkyleneimine unsaturated monomer and reactive on polymerizable unsaturated groups of the polyalkyleneimine unsaturated monomer. Preferable examples of such monomers are unsaturated carboxylic acid monomers such as unsaturated monocarboxylic acid monomers and unsaturated dicarboxylic acid monomers; styrene monomers such as styrene, bromostyrene, chlorostyrene, methylstyrene, and vinyltoluene; hydroxyl-containing unsaturated hydrocarbons such as vinyl alcohol, 3-methyl-2-buten-1-one, 3-methyl-3-buten-1-ol; and nitrogen atom-containing unsaturated monomers such as vinylpyrrolidone. They may be used alone or two or more of them may be used in combination. Other monomers are preferably at least one monomer selected from unsaturated carboxylic acid monomer, styrene monomer, hydroxyl-containing unsaturated hydrocarbon, and nitrogen atom-containing unsaturated monomers. More preferably, the above-mentioned other monomers comprise the unsaturated carboxylic acid monomer, and still more preferably, they comprise the unsaturated monocarboxylic acid monomer, and most preferably, they comprise (meth) acrylic acid.

Copolymers obtained by copolymerization of monomer components including the above-mentioned polyalkyleneimine unsaturated monomer and unsaturated carboxylic acid monomer are called also as polycarboxylic acid copolymers.

The above-mentioned unsaturated carboxylic acid monomer may be any monomer comprising polymerizable unsaturated group and carboxyl group and the like, and preferable examples are unsaturated monocarboxylic acid-based monomers and unsaturated dicarboxylic acid monomer.

The above-mentioned unsaturated monocarboxylic acid monomer may be any monomer each comprising an unsaturated group and a carboxyl group in the molecule and a preferable embodiment is a compound represented by the following formula (1).

$$CH_2=\underset{COOM}{\overset{R}{C}}\qquad(1)$$

In the formula (1), R represents hydrogen atom or methyl group; M represents hydrogen atom, a metal atom, ammonium group, or an organic ammonium group.

Examples of the metal atom represented by M in the formula (1) include monovalent metal atoms such as alkali metal atoms, e.g., lithium, sodium, and potassium; divalent metal toms such as alkaline earth metal atoms, e.g., calcium and magnesium; and trivalent metal atoms such as aluminum and iron. Preferable examples of the organic ammonium (organic amine group) are alkanolamine such as ethanolamine, diethanolamine, and triethanolamine and triethylamine. Further, ammonium may be exemplified. Preferable examples of such unsaturated monocarboxylic acid monomer are acrylic acid, methacrylic acid, and crotonic acid; their monovalent metal salts, divalent metal salts, ammonium salts, and organic amine salts. Among these, in terms of improvement of the dispersibility as a detergent builder, (meth) acrylic acid, their monovalent metal salts, divalent metal salts, ammonium salts, and organic amine salts are preferable to be used and they are preferable as the unsaturated carboxylic acid monomer.

The above-mentioned unsaturated carboxylic acid monomer may be any monomer each having one unsaturated group and two carboxyl groups in molecule and preferable examples are maleic acid, itaconic acid, citraconic acid, fumaric acid and their monovalent metal salts, divalent metal salts, ammonium salts, and organic amine salts (organic amine salts) or their anhydrides.

As the above-mentioned unsaturated carboxylic acid monomers, in addition to them, half esters of the unsaturated dicarboxylic acid-based monomers and alcohols having 1 to 22 carbon atoms; half amides of the unsaturated dicarboxylic acid monomers and amines having 1 to 22 carbon atoms; half esters of the unsaturated dicarboxylic acid-based monomers and glycols having 2 to 4 carbon atoms; and half amides of maleamine acids and glycols having 2 to 4 carbon atoms are preferable.

The following may be used as the above-mentioned other monomers: dienes such as 1,3-butadiene, isoprene, and isobutylene; (meth) acrylic acid esters such as methyl (meth) acrylate, ethyl (meth) acrylate, butyl (meth) acrylate, pentyl (meth) acrylate, hexyl (meth) acrylate, decyl (meth) acrylate, and lauryl (meth) acrylate; α-olefins such as hexene, heptene, and decene; alkyl vinyl ethers such as methyl vinyl ether, ethyl vinyl ether, and butyl vinyl ether; vinyl esters such as vinyl acetate; allyl esters such as allyl acetate;

diesters of the above-mentioned unsaturated dicarboxylic acid monomers and alcohols having 1 to 22 carbon atoms; diamides of the above-mentioned unsaturated dicarboxylic acid monomers and amines having 1 to 22 carbon atoms; diesters of the above-mentioned unsaturated dicarboxylic acid monomers and glycols having 2 to 4 glycols;

bifunctional (meth) acrylates such as hexanediol (meth) acrylate, trimethylolpropane tri(meth) acrylate, and trimethylolpropane di(meth) acrylate; unsaturated sulfonic acids such as vinyl sulfonate, (meth) allyl sulfonate, 2-(meth) acryloxyethyl sulfonate, 3-(meth) acryloxypropyl sulfonate, 3-(meth) acryloxy-2-hydroxypropyl sulfophenyl ether, 3-(meth) acryloxy-2-hydroxypropyloxy sulfobenzoate, 3-(meth) acryloxy-2-hydroxypropyl oxysulfobenzoate, 4-(meth) acryloxybutyl sulfonate, (meth) acrylamide methylsulfonic acid, (meth) acrylamide ethylsulfonic acid, 2-methylpropanesulfonic acid (meth) acrylamide, and styrenesulfonic acid; their monovalent metal salts, divalent metal salts, ammonium salts, and organic ammonium salts (organic amine salts);

unsaturated amides such as (meth) acrylamide, (meth) acrylalkylamide, N-methylol(meth) acrylamide, and N,N-dimethyl(meth) acrylamide; allyls such as allyl alcohol; unsaturated amino compounds such as dimethylaminoethyl (meth) acrylate; vinyl ethers or allyl ethers such as methoxypolyethylene glycol monovinyl ether, polyethylene glycol monovinyl ether, methoxypolyethylene glycol mono(meth) ally ether, and polyethylene glycol mono(meth) allyl ether;

and (meth) acrylate compounds such as hydroxyethyl (meth) acrylate, hydroxypropyl(meth) acrylate, methoxyethyl (meth) acrylate, ethoxyethyl(meth) acrylate, butoxyethylethyl (meth) acrylate, and methoxypropyl (meth) acrylate.

With respect to the copolymer contained in the detergent builder of the present invention, the weight ratios of the respective monomers composing the copolymer are preferably 1 to 99% by weight for the polyalkyleneimine unsaturated monomer and 99 to 1% by weight of other monomers. If the weight ratios of these monomers are out of the above-mentioned ranges, the function of the repeating units composed of the respective monomers cannot sufficiently be exhibited and therefore, the sufficient function of the present invention cannot be provided. The weight ratios are more preferably 20 to 95% by weight of the polyalkyleneimine unsaturated monomer and 5 to 80% by weight of other monomers. The weight ratios of the polyalkyleneimine unsaturated monomer and other monomers are % by weight in the case that the total weight of the polyalkyleneimine unsaturated monomer and other monomers is determined to be 100% by weight.

If the ratio of other monomers is too high, gelation and crosslinking reaction may probably occur in preparation of the copolymer and the water solubility of the copolymers is possibly decreased. Decrease of the water solubility can be prevented by decreasing the repeating unit composed of other monomers per one molecule of the copolymer by adjusting the amount of the unsaturated compounds to be used for production the polyalkyleneimine unsaturated monomer or by decreasing the polymerization degree of the repeating unit by adjusting the amount of other monomers.

Then, a copolymerization method of the monomer component will be described as a production method of the copolymer of the present invention.

As the production method of the above-mentioned copolymer, preferably, a compound obtained by adding alkyleneoxide to polyalkyleneimine is reacted with an unsaturated compound and, then, the resultant polyalkyleneimin-based unsaturated monomer is copolymerized with other monomers.

As the above copolymerization method, for example, using the monomer components and a polymerization initiator, known polymerization methods such as a solution polymerization or bulk polymerization method can be exemplified. As the polymerization initiator, known ones can be employed and preferable examples are persulfates such as sodium persulfate, potassium persulfate, and ammonium persulfate; bisulfites such as sodium bisulfite, potassium bisulfite, and ammonium bisulfite; sulfites, pyrosulfites; azo compounds such as 2,2'-azobis(2-amidinopropane) hydrochloride, 4,4'-azobis (4-cyanoparellic acid), azobis (isobutyronitrile) and 2,2'-azobis(4-methoxy-2,4-dimethylvaleronitrile); organic peroxides such as benzoyl peroxide, lauroyl peroxide, peracetic acid, di-tert-butyl peroxide, and cumene hydroperoxide; and hydrogen peroxide. These polymerization initiators may be used alone or two or more of them may be used in combination. As the polymerization initiators, it is preferable to use one or more persulfates and bisulfites, respectively.

In the case of using a persulfate and a bisulfite as the polymerization initiator, it is preferable to use the bisulfite 0.5 to 5 parts by mass (weight) to the persulfate 1 part by mass. It is more preferably 1 part by mass or more and still more preferably 2 parts by mass or more. It is also more preferably 4 parts by mass or less and still more preferably 3 parts by mass or less. If the ratio of the hydrogen persulfite is less than 0.5 part by mass, the total amount of the initiator is probably increased at the time of decreasing the molecular weight of the copolymer and if it exceeds 5 parts by mass, side reaction possibly occurs more and accordingly impurities are probably increased.

In the above-mentioned copolymerization method, a chain transfer agent may be used based on the necessity. As such a chain transfer agent, one or more of known agents may be used.

As an addition method of the above-mentioned polymerization initiator and chain transfer agent, a continuous charging method such as a dropping and divided charging can be employed. Also, the chain transfer agent alone may be introduced into a reaction container or may be mixed previously with polyalkyleneimine unsaturated monomer and other monomers composing the monomer components, a solvent or the like.

In the above-mentioned copolymerization method, an addition method of the monomer components and the polymerization initiator and the like to the reaction container (vessel) may be preferably a method comprising charging the reaction vessel with all monomer components and then adding the polymerization initiator thereto to conduct copolymerization; the method comprising charging the reaction vessel with some of monomer components and then adding the polymerization initiator and residual monomer components thereto to conduct copolymerization; and the method comprising charging the reaction vessel with the polymerization solvent and then adding the whole amount of the monomers and polymerization initiator thereto. Among these methods, the method comprising carrying out copolymerization by adding dropwise the polymerization initiator and the monomer components successively is preferable since the molecular weight distribution of the product copolymer can be made narrow (sharp) and the dispersibility of the copolymer in the case of using the copolymer as a detergent builder can be improved thereby.

The above-mentioned copolymerization method may be carried out either batchwise or continuously. Further, in the case of copolymerization, as a solvent to be used based on the necessity, known solvents may be used and preferable examples are water: alcohols such as methyl alcohol, ethyl alcohol, and isopropyl alcohol; glycerin; polyethylene glycol; aromatic or aliphatic hydrocarbons such as benzene, toluene, xylene, cyclohexane, and n-butane; esters such as ethyl acetate, ketones such as acetone and methyl ethyl ketone; amides such as dimethylformaldehyde; and ethers such as diethyl ether and dioxane. They may be used alone or two or more of them may be used in combination. Among these, in terms of the solubility of the copolymer obtained from the monomer components, one or two or more solvents selected from water and lower alcohols having 1 to 4 carbon atoms are preferably used.

The use amount of the solvent is preferably 40 to 200% by mass to the monomer components 100% by mass (% by weight). It is more preferably 45% by mass or more and still more preferably 50% by mass or more. It is also preferably 180% by mass or less and still more preferably 150% by mass or less. If the use amount of the solvent is less than 10% by mass, the molecular weight of the copolymer to be obtained possibly becomes high, and if it exceeds 200% by mass, the concentration of the copolymer to be obtained possibly becomes thin and it may be required to remove the solvent. The solvent may be charged in the reaction container partially or entirely in the polymerization initial period, or a part of the solvent may be added (dropwise titrated) to the reaction system during the polymerization reaction, or while being used previously for dissolving the monomer components and the initiator, the solvent may be added (dropwise titrated) together with these components to the polymerization system during the polymerization reaction.

In the above-mentioned copolymerization method, the copolymerization conditions such as copolymerization temperature or the like may properly be determined depending on the copolymerization method, solvent, and polymerization initiator to be employed, however the copolymerization temperature is, in general, preferably 0° C. or more and 150° C. or less. It is more preferably 40° C. or more, still more preferably 60° C. or more, and particularly preferably 80° C. or more. It is also more preferably 120° C. or less and still more preferably 110° C. or less.

The above-mentioned copolymerization temperature is no need to be kept constant all the time in the polymerization reaction and for example, polymerization may be started from a room temperature and it is increased to a set temperature at a proper temperature increase time or temperature increase rate and then it may be kept at the set temperature or the temperature may be changed (increased or decreased) with the lapse of time during the polymerization reaction depending on the monomer components and initiator and the dropwise addition method.

With respect to the pressure in the reaction system of the copolymerization method, it may be a normal pressure (the atmospheric pressure), a reduced pressure, or a pressurized condition, however in terms of the molecular weight of the copolymer to be obtained, the reaction is preferably carried out in a normal pressure or in closed state of the reaction system under pressurized pressure. Further, in terms of the facility such as a pressurizing apparatus or a pressure reducing apparatus or a reaction container or a pipeline with pressure resistance, it is preferable to carry out the reaction in a normal pressure (atmospheric pressure). With respect to the ambient atmosphere in the reaction system, it may be in atmospheric air, however it is preferably in an inert gas atmosphere and for example, the inside of the system is preferably replaced with an inert gas such as nitrogen before starting the polymerization.

The pH condition may properly be changed depending on the initiator to be used. For example, in the case a persulfate and a bisulfite are used, it is preferable to carry out the reaction under acidic condition. By executing the reaction under the acidic condition, viscosity increase of the aqueous solution of the polymerization reaction system can be suppressed and thus the copolymer can be produced well. Further, the polymerization reaction can be proceeded under the condition of a high concentration, the production efficiency can considerably be increased.

As the acidic condition, pH is preferably 1 to 6 at 25° C. of the reaction solution during the polymerization. It is more preferably 5 or less and still more preferably 3 or less.

The copolymer to be obtained by the above-mentioned copolymerization method may be used as it is for the main component of a detergent builder and if necessary, it may be used after neutralized by an alkaline substance. As the alkaline substance, inorganic salts such as hydroxides, chlorides, and carbonates of monovalent and divalent metals; ammonia; and organic ammonium (organic amines) are preferable.

The degree of neutralization in the case of the copolymerization may properly be changed depending on the initiator. For example, in the case the persulfate and the bisulfite are used and additionally in the case above-mentioned other monomers can be in form of salts, the copolymerization of the monomer components is preferably carried out at a degree of neutralization of other monomers of 0 to 60 mol %. The degree of neutralization of other monomers can be expressed on the basis of mol % of other monomers which form salts in the total of other monomer 100 mol %. If the degree of neutralization of other monomers exceeds 60 mol %, the polymerization ratio in the copolymerization process is not increased and the molecular weight of the copolymer to be obtained or the production efficiency may possibly be decreased. It is more preferably 50 mol % or less, still more preferably 40 mol % or less, even more preferably 30 mol % or less, particularly preferably 20 mol % or less, and most preferably 10 mol %.

Suitable as the method of carrying out the copolymerization using the above other monomers at a degree of neutralization of 0 to 60 mol %, for example, in the case other monomers are unsaturated carboxylic acid monomers, are the method comprising subjecting the all acid form unsaturated carboxylic acid monomer, namely the whole unsaturated carboxylic acid monomer in which Min the above formula (1) is a hydrogen atom, to copolymerization without neutralization, and the method comprising subjecting the unsaturated carboxylic acid monomer to copolymerization after neutralization with an alkaline substance to the form of a salt, such as sodium salt or ammonium salt and the like, at a degree of neutralization of 0 to 60 mole %.

As described above, the copolymer of the present invention is obtained by copolymerization of the monomer components and with respect to the molecular weight of such a copolymer, the weight average molecular weight (Mw) measured on the basis of polyethylene glycol by gel permeation chromatography (hereinafter referred to as GPC) is preferably 500 or more and 500000 or less. If it is less than 500, the dispersibility of the copolymer may possibly be decreased and if it exceeds 500000, the dispersibility and the compatibility with the liquid detergent of the copolymer may possibly be decreased. It is more preferably 5000 or more and even more preferably 8000 or more. It is also more preferably 300000 or less and most preferably 100000 or less. In this description, the weight average molecular weight of the copolymer can be measured by the weight average molecular weight measurement method described later.

The copolymer of the present invention is preferably usable for the detergent builder and exhibits the function of preventing the stains from redeposition (re-adhering) to the clothes being washed. When the copolymer prevents the stains from redeposition, the copolymer has a repelling function attributed to the steric structure formed by the polyalkyleneoxide chains and other monomers and also exhibits a function of decreasing the affinity with the stains in the case the copolymer has hydrophobic groups derived from other monomers and a function of dispersing the stains in the case the copolymer has hydrophilic groups derived from other monomers. The mutual function to the stains is changed based on the ionic property such as the anionic property or the cationic property.

Since the above-mentioned detergent builder is excellent in the compatibility with a surfactant and the detergent to be obtained becomes a high concentration liquid detergent, the detergent builder can be used preferably as a builder for a liquid detergent. Owing to the excellent compatibility with the surfactant, the transparence becomes good in the case using for a liquid detergent and a problem that separation of the liquid detergent caused by turbidity can be prevented. Further, owing to the excellent compatibility, the liquid detergent can have a high concentration and is provided with improved cleaning (washing) ability.

The above-mentioned detergent builder is excellent in the anti-redeposition and scarcely causes capability deterioration in the case of long time storage and impurity precipitation in the case of storage at a low temperature and thus it is remarkably excellent in the quality and capability and stability.

The detergent builder of the present invention is, as described above, preferable to comprise the copolymer produced from monomers containing the polyalkyleneimine unsaturated monomer having oxyalkylene group. The present invention is also a builder for a detergent, comprising a copolymer having a polyalkyleneimine-alkyleneoxide structure, wherein an anti-redeposition of the builder for a detergent is not less than 69.6% in the case of using a blended fabric or not less than 73.6% in the case of using cotton, or a detergency ratio is not less than 24.3%. Among such detergent builders, those which satisfy all of three properties, that is, the anti-redeposition in the case of using a blended fabric, the anti-redeposition in the case of using cotton, and the detergency ratio are preferable. Further, the anti-redeposition in the case of using a blended fabric is preferably 73.0% or more and more preferably 76.0% or more. The anti-redeposition in the case of using cotton is preferably 76.0% or more and more preferably 78.0% or more. The detergency ratio is preferably 24.4%. The above-mentioned blended fabric is a cotton and polyester blend, and the above-mentioned anti-redeposition and the detergency ratio may be measured by the following methods.

<Anti-Redeposition>

(1) The whiteness degree of white cloth prepared by cotton cloth and cotton/polyester blended fabric cloth to be used as samples is previously measured based on the reflectance. The reflectance measurement may be carried out by using a colorimetric color-difference meter ND-1001DP model (produced by Nippon Denshoku Co., Ltd.).

(2) Hard water is prepared by adding pure water to 1.47 g of calcium chloride dihydrate so that the total amount is 10 kg.

(3) Pure water is added to 4.8 g of polyoxyethylene lauryl ether sulfuric acid sodium salt (AES), 0.6 g of polyoxyethylene lauryl ether (AE), 0.6 g of sodium borate, 0.9 g of citric acid, and 2.4 g of propylene glycol to be 80 g in total. The pH is adjusted to be 8.2 with an aqueous sodium hydroxide solution and then pure water is added to adjust the total weight (mass) to be 100 g and obtain an aqueous surfactant solution.

(4) A tergotometer is set at 27° C. and 1000 mL of hard water and 0.5 g of JIS 11 type clay are put in a pot and stirred at 100 rpm for 1 minute.

(5) 5 mL of an aqueous polymer solution (concentration 0.28%) and 4.8 mL of the aqueous surfactant solution prepared in (3), and 5.2 to 5.4 g of white cloth are put in the pot and stirred at 100 rpm for 10 minutes.

(6) Water of the cloth is squeezed by hands and 1 L of hard water is put in the pot and stirred at 100 rpm for 2 minutes.

(7) The steps (4) to (6) are repeated 3 times.

(8) The white cloth is dried by ironing through another cloth while being smoothed and the whiteness degree of the white cloth is again measured based on the reflectance by the calorimetric color-difference meter.

(9) The anti-redeposition is calculated from the results according to the following formula Anti-redeposition(%)=(whiteness degree after cleaning)/(whiteness degree of the original white cloth)×100

<Detergency Ratio>

(1) As a sample, artificially soiled fabric is used. As the artificially soiled fabric, a cloth (STCGCC "clay-stained") made available by Scientific Service Co. is used, and whiteness degree is previously measured based on the reflectance. The reflectance measurement may be carried out by using a colorimetric color-difference meter ND-1001DP model (produced by Nippon Denshoku Co., Ltd.).

(2) Hard water is prepared by adding pure water to 1.47 g of calcium chloride dihydrate so that the total amount is 10 kg.

(3) Pure water is added to 4.8 g of polyoxyethylene lauryl ether sulfuric acid sodium salt (AES), 0.6 g of polyoxyethylene lauryl ether (AE), 0.6 g of sodium borate, 0.9 g of citric acid, and 2.4 g of propylene glycol to be 80 g in total. The pH is adjusted to be 8.2 with an aqueous sodium hydroxide solution and then pure water is added to adjust the total weight (mass) to be 100 g and obtain an aqueous surfactant solution.

(4) A tergotometer is set at 27° C. and 1000 mL of hard water, 5 mL of an aqueous polymer solution (concentration 0.28%), and 4.8 mL of the aqueous surfactant solution prepared in (3), and 5.2 to 5.4 g of artificially soiled fabric (STC GC C cloth) are put in the pot and stirred at 100 rpm for 10 minutes.

(5) The artificially soiled fabric is taken out of the pot and water of the cloth is squeezed by hands. 1000 mL of hard water is put in the pot and the dewatered artificially soiled fabric is put in the pot and stirred at 100 rpm for 2 minutes.

(6) The artificially soiled fabric is taken out of the pot and after water of the cloth is squeezed by hands, the artificially soiled fabric is dried by ironing through another cloth while being smoothed and the whiteness degree of the dried artificially soiled fabric is again measured based on the reflectance by the calorimetric color-difference meter.

(7) The detergency ratio (%) is calculated from the results according to the following formula Detergency ratio(%)=(whiteness degree of the artificially soiled fabric after cleaning–whiteness degree of the artificially soiled fabric before cleaning)/(whiteness degree of the original white cloth (*EMPA*221) of the artificially soiled fabric– whiteness degree of the artificially soiled fabric before cleaning)×100

The addition ratio of the above-mentioned copolymer in the detergent builder is preferably 0.1 to 80% by mass in the detergent builder 100% by mass. If it is less than 0.1% by mass, the cleaning power (detergency) is possibly insufficient in the case the copolymer is used for a detergent composition and if it exceeds 80% by mass, it may be uneconomical. The amount of the copolymer is more preferably 1% by mass or more and still more preferably 5% by mass or more. Also, it is more preferably 70% by mass or less and still more preferably 65% by mass or less.

With respect to other composition components besides the copolymer and their blending ratios in the above-mentioned detergent builder, conventionally known various components to be used for the detergent builder can properly be used at proper blending ratios determined so as not to interfere the functional effects of the present invention.

The above-mentioned copolymer can exhibit the capability such as dispersibility in a variety of uses and for example, it can be used preferably also for a water treatment agent, a dispersant, a fiber treatment agent, a scale inhibitor (scale preventing agent), a cement additive, a metal ion sequestration, a thickener, various binders and so forth. A water treatment agent and a dispersant comprising the above-mentioned copolymer are also included as preferable embodiments of the present invention.

The above-mentioned water treatment agent may be added, for example, to water systems such as a cooling water system, a boiler water system, and the like. In this case, the copolymer may be added as it is or it may be added in combination with other components. With respect to the composition components other than the copolymer in the water treatment agent and their blending ratios, conventionally known various components to be used for the water treatment agent can properly be used at proper blending ratios determined so as not to interfere the functional effects of the present invention.

The above-mentioned dispersant may be a water-based type dispersant and for example, a pigment dispersant, a cement dispersant, a calcium carbonate dispersant, and kaolin dispersant are preferable. Such a dispersant provides extremely excellent dispersibility which the copolymer intrinsically has. Further, the dispersant shows high quality and high capability and can be so excellent in stability as not to cause deterioration of capability even after storage for a long duration and impurity precipitation even in the case of low temperature storage. With respect to the composition components other than the copolymer in the dispersant and their blending ratios, conventionally known various components to be used for the dispersant can properly be used at proper blending ratios determined so as not to interfere the functional effects of the present invention.

Further, the present invention is also a detergent composition comprising the above-mentioned detergent builder.

The above-mentioned detergent composition may be a powder detergent composition or a liquid detergent composition. However, since the above-mentioned copolymer is excellent in the compatibility (solubility) with a liquid detergent, a liquid detergent composition is preferable. The above-mentioned detergent composition may contain additives to be used for usual detergent, other than the above-mentioned detergent builder. Preferable examples of the above-mentioned additives are an alkali builder, a chelate builder, a redeposition inhibitor such as carboxymethyl cellulose sodium salt for preventing redeposition of the staining substances, a soil repellent agent such as benzotriazole and ethylene-thiourea, a soil release agent, a dye transfer inhibitor, a softener, an alkaline substance for pH adjustment, a fragrance, a solubilization agent, a fluorescent agent, a coloring agent, a foaming agent, a foam stabilizer, a glazing agent, a disinfectant, a bleaching agent, a bleaching assistant, an enzyme, a dye, a solvent and the like. Also, a zeolite is preferably added in the case of the powder detergent composition.

The blending ratio of the above-mentioned detergent builder is generally preferably 0.1 to 20% by mass in the detergent composition 100% by mass. It is more preferably 0.2% by mass or more and 15% by mass or less, still more preferably 0.3% by mass or more and 10% by mass or less, particularly preferably 0.4% by mass or more and 8% by mass or less, and even more preferably 0.5% by mass or more and 5% by mass or less. If the blending ratio of the detergent builder is less than 0.1% by mass, it may be impossible to exhibit sufficient detergent capability and if it exceeds 20% by mass, it results in economical disadvantage.

The blending state of the above-mentioned copolymer in the above-mentioned detergent composition may be both of liquid form and solid form and may be determined depending on the state (e.g., a liquid product or a solid product) of commercialization of the detergent. The copolymer may be blended in form of an aqueous solution after polymerization, or in concentrated state by decreasing the water of the aqueous solution to a certain extent, or in dried and solidified state.

The above-mentioned detergent composition includes a detergent to be used only for a specified use such as a bleaching detergent by increasing the function of only one component, besides synthetic detergents for domestic detergents, industrial detergents for fiber industries and other industries, and hard surface detergents.

The above-mentioned surfactant is at least one kind surfactant selected from an anionic surfactant, a nonionic surfactant, a cationic surfactant, and an amphoteric surfactant and one or two or more species of these surfactants may be used. In the case two or more species are used, the total use amount of the anionic surfactants and nonionic surfactant is preferably 50% by mass or more in the total surfactants 100% by mass, more preferably 60% by mass or more, still more preferably 70% by mass or more, and particularly preferably 80% by mass or more.

Preferable examples of the above-mentioned anionic surfactants include alkylbenzenesulfonic acid salts, sulfuric acid alkyl ether salts, sulfuric acid alkenyl ether salts, alkylsulfuric acid salts, alkenylsulfuric acid salts, α-olefinsulfonic acid salts, α-sulfofatty acids or ester salts, alkanesulfonic acid salts, saturated fatty acid aminoacid surfactants, N-acylamino acid surfactants, alkylphosphoric acid esters or their salts, and alkenylphosphoric acid esters or their salts.

The alkyl and alkenyl in the above-mentioned anionic surfactants may be branched groups of alkyl such as methyl.

Preferable examples of the nonionic surfactants include polyoxyalkylene alkyl ethers, polyoxyalkylene alkenyl ethers, polyoxyethylene alkyl phenyl ethers, higher fatty acid alkanolamides, or their alkyleneoxide addition products, sucrose fatty acid esters, alkyl glycoxides, fatty acid glycerin monoesters, and alkylamine oxides. The alkyl and alkenyl in the above-mentioned nonionic surfactants may be branched groups of alkyl such as methyl.

As the above-mentioned cationic surfactants, quaternary ammonium salts are preferable.

As the above-mentioned amphoteric surfactants, carboxyl amphoteric surfactants and sulfobetaine-based amphoteric surfactants are preferable.

The alkyl and alkenyl in the above-mentioned cationic surfactants and amphoteric surfactants may be branched groups of alkyl such as methyl.

The blending ratio of the above-mentioned surfactant is in general, preferably 10 to 60% by mass in the detergent composition 100% by mass. It is more preferably 15% by mass or more and 50% by mass or less, still more preferably 20% by mass or more and 45% by mass or less, and particularly preferably 25% by mass or more and 40% by mass or less. If the blending ratio of the surfactant is less than 10% by mass, it may be impossible to exhibit sufficient detergency and if it exceeds 60% by mass, it results in economical disadvantage.

In the case the detergent composition is a liquid detergent composition, the water amount contained in the liquid detergent composition is, in general, preferably 0.1 to 75% by mass in the liquid decomposition 100% by mass. It is more preferably 0.2% by mass or more and 70% by mass or less, still more preferably 0.5% by mass or more and 65% by mass or less, even more preferably 0.7% by mass or more and 60% by mass or less, particularly preferably 1% by mass or more and 55% by mass or less, and most preferably 1.5% by mass or more and 50% by mass or less.

The liquid detergent composition is preferable to have kaolin turbidity 200 mg/L or less. It is more preferably 150 mg/L or less, still more preferably 120 mg/L or less, particularly preferably 100 mg/L or less, and most preferably 50 mg/L or less. The alteration (difference) of the kaolin turbidity between the case of adding the detergent builder of the present invention to the liquid detergent composition and the case of adding no detergent builder of the present invention is preferably 500 mg/L or less. It is more preferably 400 mg/L or less, still more preferably 300 mg/L or less, particularly preferably 200 mg/L or less, and most preferably 100 mg/L or less. The kaolin turbidity can be measured by, for example, a kaolin turbidity measurement method described later.

As an enzyme to be added to the detergent composition of the present invention, protease, lipase, and cellulase are preferable. Among them, protease, alkalilipase and alkalicellulase, which have high activity in alkali washing solution, are preferable.

The addition amount of the enzyme is preferably 5% by mass or less in the detergent composition 100% by mass. If it exceeds 5% by mass, no cleaning power (detergency) improvement is observed and it may result in economical disadvantage.

As the alkali builder, silicates, carbonates, and sulfates are preferable. As the chelate builder, diglycolic acid, oxycarboxylic acid salts, EDTA (ethylenediamine tetraacetic acid), DTPA (diethylenetriamine pentaacetic acid), and citric acid are preferable. Water-soluble polycarboxylic acid polymers other than the copolymer of the present invention may be used.

The above-mentioned detergent composition can become a detergent, which is excellent in the dispersibility and shows high quality and high capability and can be so excellent in stability as not to cause deterioration of capability even after storage for a long time and impurity precipitation even in the case of low temperature storage.

Owing to the above-mentioned constitution, the detergent builder of the present invention is excellent in the compatibility with the liquid detergent and exhibits high basic functions in terms of recontamination prevention ability and detergency ratio and the like, therefore the detergent builder is useful as an essential component of the detergent composition, for example, by using it with an active agent in combination.

BEST MODE FOR CARRYING OUT THE INVENTION

The present invention is more specifically described below by way of the Examples. It must be noted, however, that the invention is not limited to these Examples alone. In the Examples, "%" denotes "% by mass (weight)", unless otherwise specified.

EXAMPLE 1

A separable flask made of SUS having 2.5 L capacity equipped with a reflux condenser and a stirrer was charged (loaded) with 288 g of a compound obtained by adding 20 mol of ethylene oxide to polyethylene imine with a molecular weight of 600 (hereinafter, this compound is referred to as IO620 for short). While being stirred, IO620 was heated to 40° C. and IO620 was completely dissolved, and then 1.77 g of allyl glycidyl ether (hereinafter, abbreviated as AGE) was slowly dropwise added over 10 minutes. After that, the resulting mixture was stirred for 30 minutes until it became even and heated to 60° C. and further reacted for 60 minutes.

200 g of pure water and 0.0200 g of a Mohr's salt were added to the reaction product and the mixture was heated to 90° C. Next, while being stirred, 90 g of an aqueous 80% acrylic acid solution (hereinafter, abbreviated as 80% AA), 100 g of an aqueous 10% sodium persulfate solution (hereinafter, abbreviated as 10% NaPS), and 200 g of an aqueous 10% sodium bisulfite solution (hereinafter, abbreviated as 10% SBS) were respectively dropwise added through separate dropping ports to the polymerization reaction solution kept at about 90° C. Addition of the respective components was started simultaneously and the dropwise addition durations (time) were 180 minutes for 80% AA, 190 minutes for 10% NaPS, and 180 minutes for 10% SBS, respectively. The dropwise addition was carried out continuously, and during the addition, the dropping speeds of the respective components were kept constant.

After completion of the dropwise addition, the polymerization reaction solution was aged at 90° C. further for 30 minutes to complete the polymerization. After completion of the polymerization, the polymerization reaction solution was cooled while being stirred and neutralized by adding 70.8 g of 48% sodium hydroxide (hereinafter, abbreviated as 48% NaOH) to obtain a polymer (1).

The production process and the analysis results are shown in Table 1-1.

TABLE 1-1

| Loaded composition | Example 1 Polymer (1) | IO620/AA = 80/20 wt % (weight %) | |
|---|---|---|---|
| Macromer synthesis Initial load | | | |
| IO620 | | (g) | 288.00 |
| Dropwise addition | | | |
| AGE | | (g) | 1.77 |
| Reaction time | | (min) | 60 |
| Reaction temperature | | (° C.) | 60 |
| Polymerization Initial load | | | |
| The above mentioned macromer | | (g) | 289.77 |
| Pure water | | (g) | 200.00 |
| Mohr's salt | | (g) | 0.0200 |
| Dropwise addition | | | |
| 80% AA | | (g) | 90.00 |
| 10% NaPS | | (g) | 100.00 |
| 10% SBS | | (g) | 200.00 |
| Dropwise addition time | | | |
| 80% AA | | (min) | 0-180 |
| 10% NaPS | | (min) | 0-190 |
| 10% SBS | | (min) | 0-180 |
| Aging time | | (min) | 30 |
| Polymerization/aging temperature | | (° C.) | 90 |
| Post-treatment | | | |
| 48% NaOH | | (g) | 70.80 |
| Final neutrarization degree | | (%) | 85 |

TABLE 1-1-continued

| Loaded composition | Example 1 Polymer (1) | IO620/AA = 80/20 wt % (weight %) | |
|---|---|---|---|
| Result | | | |
| Weight average molecular weight | | Mw | 7200 |
| Solid matter concentration | | (%) | 45 |

EXAMPLE 2

A polymer (2) was obtained in the same manner as Example 1, except that the amount of AGE was changed to 3.53 g.

The production process and the analysis results are shown in Table 1-2.

TABLE 1-2

| Load composition | Example 2 Polymer (2) | IO620/AA = 80/20 wt % | |
|---|---|---|---|
| Macromer synthesis Initial load | | | |
| IO620 | | (g) | 288.00 |
| Dropwise addition | | | |
| AGE | | (g) | 3.53 |
| Reaction time | | (min) | 60 |
| Reaction temperature | | (° C.) | 60 |
| Polymerization Initial load | | | |
| The above-mentioned macromer | | (g) | 291.53 |
| Pure water | | (g) | 200.00 |
| Mohr's salt | | (g) | 0.0201 |
| Dropwise addition | | | |
| 80% AA | | (g) | 90.00 |
| 10% NaPS | | (g) | 100.00 |
| 10% SBS | | (g) | 200.00 |
| Dropwise addition time | | | |
| 80% AA | | (min) | 0-180 |
| 10% NaPS | | (min) | 0-190 |
| 10% SBS | | (min) | 0-180 |
| Aging time | | (min) | 30 |
| Polymerization/aging temperature | | (° C.) | 90 |
| Post-treatment | | | |
| 48% NaOH | | (g) | 70.80 |
| Final neutrarization degree | | (%) | 85 |
| Result | | | |
| Weight average molecular weight | | Mw | 8300 |
| Solid matter concentration | | (%) | 45 |

EXAMPLE 3

A polymer (3) was obtained in the same manner as Example 1, except that the amount of AGE was changed to 8.72 g.

The production process and the analysis results are shown in Table 1-3.

TABLE 1-3

Example 3
Polymer (3)

| Load composition | | IO620/AA = 80/20 wt % |
|---|---|---|
| Macromer synthesis Initial load | | |
| IO620 | (g) | 288.00 |
| Dropwise addition | | |
| AGE | (g) | 8.72 |
| Reaction time | (min) | 60 |
| Reaction temperature | (° C.) | 60 |
| Polymerization Initial load | | |
| The above-mentioned macromer | (g) | 296.72 |
| Pure water | (g) | 200.00 |
| Mohr's salt | (g) | 0.0202 |
| Dropwise addition | | |
| 80% AA | (g) | 90.00 |
| 10% NaPS | (g) | 100.00 |
| 10% SBS | (g) | 200.00 |
| Dropwise addition time | | |
| 80% AA | (min) | 0-180 |
| 10% NaPS | (min) | 0-190 |
| 10% SBS | (min) | 0-180 |
| Aging time | (min) | 30 |
| Polymerization/aging temperature | (° C.) | 90 |
| Post-treatment | | |
| 48% NaOH | (g) | 70.80 |
| Final neutralization degree | (%) | 85 |
| Result | | |
| Weight average molecular weight | Mw | 15300 |
| Solid matter concentration | (%) | 45 |

EXAMPLE 4

A separable flask made of SUS having 2.5 L capacity equipped with a reflux condenser and a stirrer was charged with 216 g of IO620. While being stirred, IO620 was heated to 40° C. and IO620 was completely dissolved, and then 6.54 g of AGE was slowly dropwise added over 10 minutes. After that, the resulting mixture was stirred for 30 minutes until it became even and heated to 60° C. and further reacted for 60 minutes.

200 g of pure water and 0.0209 g of a Mohr's salt were added to the reaction product and the mixture was heated to 90° C.

Next, while being stirred, 180 g of 80% AA, 133.3 g of an aqueous 15% sodium persulfate solution (hereinafter, abbreviated as 15% NaPS), and 114.3 g of an aqueous 35% sodium hydrogen sulfite solution (hereinafter, abbreviated as 35% SBS) were respectively dropwise added through separate dropping ports to the polymerization reaction solution kept at about 90° C. Addition of the respective components was started simultaneously and the dropwise addition durations were 180 minutes for 80% AA, 190 minutes for 15% NaPS, and 180 minutes for 35% SBS, respectively. The dropwise addition was carried out continuously, and during the addition, the dropping speeds of the respective components were kept constant.

After completion of the dropwise addition, the polymerization reaction solution was aged at 90° C. further for 30 minutes to complete the polymerization. After completion of the polymerization, the polymerization reaction solution was cooled while being stirred and neutralized by adding 70.8 g of 48% NaOH to obtain a polymer (4).

The production process and the analysis results are shown in Table 1-4.

TABLE 1-4

Example 4
Polymer (4)

| Load composition | | IO620/AA = 60/40 wt % |
|---|---|---|
| Macromer synthesis Initial load | | |
| IO620 | (g) | 216.00 |
| Dropwise additon | | |
| AGE | (g) | 6.54 |
| Reaction time | (min) | 60 |
| Reaction temperature | (° C.) | 60 |
| Polymerization Initial load | | |
| The above-mentioned macromer | (g) | 222.54 |
| Pure water | (g) | 200.00 |
| Mohr's salt | (g) | 0.0209 |
| Dropwise additon | | |
| 80% AA | (g) | 180.00 |
| 15% NaPS | (g) | 133.30 |
| 35% SBS | (g) | 114.30 |
| Dropwise additon time | | |
| 80% AA | (min) | 0-180 |
| 15% NaPS | (min) | 0-190 |
| 35% SBS | (min) | 0-180 |
| Ading time | (min) | 30 |
| Polymerization/aging temperature | (° C.) | 90 |
| Post-treatment | | |
| 48% NaOH | (g) | 141.70 |
| Final neutralization degree | (%) | 85 |
| Result | | |
| Weight average molecular weight | Mw | 8900 |
| Solid matter concentration | (%) | 50 |

EXAMPLE 5

A separable flask made of SUS having 2.5 L capacity equipped with a reflux condenser and a stirrer was charged with 108 g of a compound obtained by adding 8 mol of ethylene oxide to polyethyleneimine with a molecular weight of 300 (hereinafter, this compound is referred to as IO308 for short). While being stirred, IO308 was heated to 40° C. and IO308 was completely dissolved, and then 9.12 g of AGE was slowly dropwise added over 10 minutes. After that, the resulting mixture was stirred for 30 minutes until it became even and heated to 60° C. and further reacted for 60 minutes.

110 g of pure water and 0.0108 g of a Mohr's salt were added to the reaction product and the mixture was heated to 90° C.

Next, while being stirred, 90 g of 80% AA, 66.7 g of 15% NaPS, and 57.1 g of 35% SBS were respectively dropwise added through separate dropping ports to the polymerization reaction solution kept at about 90° C. Addition of the respective components was started simultaneously and the dropwise addition durations were 180 minutes for 80% AA, 190 minutes for 15% NaPS, and 180 minutes for 35% SBS, respectively. The dropwise addition was carried out continuously, and during the addition, the dropping speeds of the respective components were kept constant.

After completion of the dropwise addition, the polymerization reaction solution was aged at 90° C. further for 30 minutes to complete the polymerization. After completion of the polymerization, the polymerization reaction solution was cooled while being stirred and neutralized by adding 70.8 g of 48% sodium hydroxide (hereinafter, abbreviated as 48% NaOH) to obtain a polymer (5).

The production process and the analysis results are shown in Table 1-5.

TABLE 1-5

Example 5
Polymer (5)

| Load composition | | IO620/AA = 60/40 wt % |
|---|---|---|
| Macromer synthesis Initial load | | |
| IO308 | (g) | 108.00 |
| Dropwise additon | | |
| AGE | (g) | 9.12 |
| Reaction time | (min) | 60 |
| Reaction temperature | (° C.) | 60 |
| Polymerization Initial load | | |
| The above-mentioned macromer | (g) | 117.12 |
| Pure water | (g) | 110.00 |
| Mohr's salt | (g) | 0.0108 |
| Dropwise additon | | |
| 80% AA | (g) | 90.00 |
| 15% NaPS | (g) | 66.70 |
| 35% SBS | (g) | 57.10 |
| Dropwise additon time | | |
| 80% AA | (min) | 0-180 |
| 15% NaPS | (min) | 0-190 |
| 35% SBS | (min) | 0-180 |
| Ading time | (min) | 30 |
| Polymerization/aging temperature | (° C.) | 90 |
| Post-treatment | | |
| 48% NaOH | (g) | 70.80 |
| Final neutralization degree | (%) | 85 |
| Result | | |
| Weight average molecular weight | Mw | 76800 |
| Solid matter concentration | (%) | 50 |

The analysis methods in Table 1-1 to Table 1-5 were carried out as follows.

<Weight Average Molecular Weight Measurement Method (GPC Analysis)>

Apparatus: L-7000 series manufactured by Hitachi Ltd.
Detector: RI
Column: SHODEX Asahipak GF-310-HQ, GF-710-HQ, GF-1G 7B manufactured by Showa Denko K.K.
Column temperature: 40° C.
Flow rate: 0.5 mL/min
Calibration curve: POLYETHYLENE GLYCOL STANDARD manufactured by Sowa Kagaku Co., Ltd.
Elution solution: 0.1 N sodium acetate/acetonitrile=3/1 (weight ratio)

<Solid Matter Concentration Measurement Method>

A sample about 1 g was set on an aluminum cup weighed to 0.1 mg precision and accurately weighed. The aluminum cup was put in a drying tumbler set at 110° C. and the sample was dried for 2 hours. After drying, the aluminum cup was transferred to a desiccator and cooled at a room temperature for 15 minutes and then weighed accurately. The solid matter concentration was calculated by dividing the weight of the sample after the drying by the weight of the sample before the drying and then multiplying calculated numeral value by 100.

With respect to the polymers (1) to (5), the compatibility, the anti-redeposition, and the cleaning power (detergency) were evaluated according to the following evaluation methods. The results are shown in Table 2.

Evaluation Methods

<Compatibility (Solubility) to Liquid Detergent>

With respect to the compatibility, ○ was marked if the kaolin turbidity was 200 mg/L or less, and X was marked if it exceeded 200 mg/L, in the case each polymer was dissolved to be in 5% by weight in a liquid solvent 100% by weight.

The kaolin turbidity was measured by sufficiently stirring the respective components to be even and each sample was charged in a 50 mm-square cell with a thickness of 10 mm and after defoaming, the turbidity at 25° C. was measured. The turbidity (kaolin concentration: mg/L) was measured by using NDH 2000 manufactured Nippon Denshoku Co., Ltd.).

The composition of the liquid detergent used for the evaluation of the compatibility was as follows.

SFT-70H (Softanol 70H manufactured by Nippon Shokubai Kagaku Kogyo Co., Ltd., polyethylene alkyl ether): 11 g, Neopelex (manufactured by Kao Corporation, sodium dodecylbenzenesulfonate): 32 g, Diethanolamine: 10 g, Ethanol: 5 g, Propylene glycol: 15 g, Copolymer or comparative copolymer obtained in the examples: 1.5 g, and Water: balance <Anti-Redeposition>

(1) White cloth was prepared by cutting cotton cloth and cotton/polyester blended fabric cloth into 5 cm×5 cm size. The whiteness degree of the white cloths was previously measured based on the reflectance, by using a calorimetric color-difference meter ND-1001DP model (produced by Nippon Denshoku Co., Ltd.).

(2) Hard water was prepared by adding pure water to 1.47 g of calcium chloride dihydrate so that the total amount was 10 kg.

(3) Pure water was added to 4.8 g of polyoxyethylene lauryl ether sulfuric acid sodium salt (AES), 0.6 g of polyoxyethylene lauryl ether (AE), 0.6 g of sodium borate, 0.9 g of citric acid, and 2.4 g of propylene glycol to be 80 g in total. The pH was adjusted to be 8.2 with an aqueous sodium hydroxide solution and then pure water was added to adjust the total weight (mass) to be 100 g and obtain an aqueous surfactant solution.

(4) A tergotometer was set at 27° C. and hard water 1000 mL and JIS 11 type clay 0.5 g were put in a pot and stirred at 100 rpm for 1 minute.

(5) 5 mL of an aqueous polymer solution (concentration 0.28%) and 4.8 mL of the aqueous surfactant solution prepared in (3), and 7 sheets of the each white cloth were put in the pot and stirred at 100 rpm for 10 minutes.

(6) Water of the cloths was squeezed by hands and hard water 1 L was put in the pot and stirred at 100 rpm for 2 minutes.

(7) The steps (4) to (6) were repeated 3 times.

(8) The white cloths were dried by ironing through another cloth while being smoothed and the whiteness degree of the white cloths was again measured based on the reflectance by the calorimetric color-difference meter.

(9) The anti-redeposition was calculated from the results according to the following formula:

Anti-redeposition(%)=(whiteness degree after cleaning)/(whiteness degree of the original white cloth)×100

The anti-redeposition is better as the numeral value is higher.

<Detergency Ratio>

(1) A cloth (prepared by cutting STC GC C "clay-stained" into 4.5 cm×7.0 cm) made available by Scientific Service Co. was used as an artificially soiled fablic. The whiteness degree of the cloth was previously measured based on the reflectance by using a calorimetric color-difference meter ND-1001DP model (produced by Nippon Denshoku Co., Ltd.).

(2) Hard water was prepared by adding pure water to 1.47 g of calcium chloride dihydrate so that the total amount was 10 kg.

(3) Pure water was added to 4.8 g of polyoxyethylene lauryl ether sulfuric acid sodium salt (AES), 0.6 g of polyoxyethylene lauryl ether (AE), 0.6 g of sodium borate, 0.9 g of citric acid, and 2.4 g of propylene glycol to be 80 g in total. The pH was adjusted to be 8.2 with an aqueous sodium hydroxide solution and then pure water was added to adjust the total weight (mass) to be 100 g and obtain an aqueous surfactant solution.

(4) A tergotometer was set at 27° C. and hard water 1000 mL, 5 mL of an aqueous polymer solution (concentration 0.28%), and 4.8 mL of the aqueous surfactant solution prepared in (3), and artificially soiled fablic (STC GC C cloth: 10 sheets) were put in the pot and stirred at 100 rpm for 10 minutes.

(5) The artificially soiled fablic was taken out of the pot and water of the cloth was squeezed by hands. Hard water 1000 mL was put in the pot and the dewatered artificially soiled fablic was put in the pot and stirred at 100 rpm for 2 minutes.

(6) The artificially soiled fablic was taken out of the pot and after water of the cloth was squeezed by hands, the artificially soiled fablic was dried by ironing through another cloth while being smoothed and the whiteness degree of the dried artificially soiled fablic was again measured based on the reflectance by the colorimetric color-difference meter.

(7) The detergency ratio (%) was calculated from the results according to the following formula:

Detergency ratio(%)=(whiteness degree of the artificially soiled fablic after cleaning−whiteness degree of the artificially soiled fablic before cleaning)/(whiteness degree of the original white cloth (*EMPA*221) of the artificially soiled fablic−whiteness degree of the artificially soiled fablic before cleaning)×100

The detergency ratio was better as the numeral value is higher.

TABLE 2

| | | Compatibility | Recontamination prevention capability (%) Hydrophilicity | | Detergency ratio (%) Hydrophilic stain (clay) |
|---|---|---|---|---|---|
| | | | Blended fabric | Cotton | |
| Example 1 | Polymer (1) | ○ | 78.4 | 78.3 | 25.3 |
| Example 2 | Polymer (2) | ○ | 76.6 | 79.8 | 24.3 |

TABLE 2-continued

| | | Compatibility | Recontamination prevention capability (%) Hydrophilicity | | Detergency ratio (%) Hydrophilic stain (clay) |
|---|---|---|---|---|---|
| | | | Blended fabric | Cotton | |
| Example 3 | Polymer (3) | ○ | 76.5 | 80.2 | 24.6 |
| Example 4 | Polymer (4) | ○ | 76.5 | 78.1 | 25.5 |
| Example 5 | Polymer (5) | ○ | 77.2 | 79.3 | 24.4 |
| Comparative Example 1 | IO620 | ○ | 67.0 | 72.3 | 24.2 |
| | Blank | | 69.5 | 73.5 | 22.1 |

In Table 2, the results of Comparative Example 1 were obtained in the case of using IO620 and the results of the blank were obtained in the case of using hard water in place of the aqueous polymer solution.

The present application claims priority under 35 U.S.C. §119 to Japanese Patent Application No.2003-353944, filed Oct. 14, 2003, entitled "POLYCALBOXYLIC ACID COPOLYMER FOR DETERGENT". The contents of those applications are incorporated herein by reference in their entirety.

The invention claimed is:

1. A detergent composition comprising usual detergent additives, a surfactant and a detergent builder which comprises a copolymer obtained by copolymerization of monomer components containing a polyalkyleneimine unsaturated monomer and other monomers, wherein said other monomers comprise an unsaturated carboxylic acid monomer and wherein said polyalkyleneimine unsaturated monomer has an oxyalkylene group, and wherein the blending ratio of said surfactant is 10 to 60% by mass in the detergent composition being 100% by mass.

2. The detergent composition according to claim 1 comprising a detergent builder which comprises a copolymer having a polyalkyleneimine-alkyleneoxide structure wherein the detergent builder exhibits an anti-redeposition for a detergent is not less than 69.6% in the case of using a blended fabric or not less than 73.6% in the case of using cotton as determined by the following method:

a) preparing white cloth by cutting cotton cloth and cotton/polyester blended fabric cloth into 5 cm×5 cm size, wherein the whiteness degree of the white cloth was previously measured based on the reflectance, by using a colorimetric color-difference meter;

b) preparing hard water by adding pure water to 1.47 g of calcium chloride dihydrate so that the total amount is 10 kg;

c) adding pure water to 4.8 g of polyoxyethylene lauryl ether sulfuric acid sodium salt, 0.6 g of polyoxyethylene lauryl ether, 0.6 g of sodium borate, 0.9 g of citric acid, and 2.4 g of propylene glycol to be 80 g in total; adjusting the pH to be 8.2 with an aqueous sodium hydroxide solution and then adding pure water to adjust the total weight (mass) to be 100 g and thereby obtaining an aqueous surfactant solution;

d) setting a tergotometer at 27° C. and putting hard water 1000 mL and JIS 11 type clay 0.5 g in a pot and stir at 100 rpm for 1 minute;

e) preparing 5 mL of an aqueous polymer solution (concentration 0.280%) and 4.8 mL of the aqueous surfactant solution in c), and putting 7 sheets of the each white cloth in the pot and stirring at 100 rpm for 10 minutes;

f) squeezing water of the cloth by hand and putting hard water 1 L in the pot and stirring at 100 rpm for 2 minutes;

g) repeat steps d) to f) 3 times;

h) drying the white cloths by ironing through another cloth while being smoothed and measuring the whiteness degree of the white cloths based on the reflectance by a colorimetric color-difference meter; and determining the anti-redesposition from the results according to the following formula:

Anti-redeposition(%)=(whiteness degree after cleaning)/(whiteness degree of the original white cloth)×100;

or a detergency ratio is not less than 24.3% as determined by the following method:

1) preparing cloth to be used as artificially soiled fabric by cutting STC GC C "clay-stained" into 4.5 cm×7.0 cm, wherein the whiteness degree of the cloth was previously measured based on the reflectance by using a colorimetric color-difference meter;

2) preparing hard water by adding pure water to 1.47 g of calcium chloride dihydrate so that the total amount is 10 kg;

3) adding pure water to 4.8 g of polyoxyethylene lauryl ether sulfuric acid sodium salt, 0.6 g of polyoxyethylene lauryl ether, 0.6 g of sodium borate, 0.9g of citric acid, and 2.4 g of propylene glycol to be 80 g in total; adjusting the pH to be 8.2 with an aqueous sodium hydroxide solution and then adding pure water to adjust the total weight (mass) to be 100 g thereby obtaining an aqueous surfactant solution;

4) setting tergotometer at 27° C. and preparing hard water 1000 mL, 5 mL of an aqueous polymer solution (concentration 0.28%), and 4.8 mL of the aqueous surfactant solution as in 3), and putting 10 sheets of artificially soiled fabric in the pot and stir at 100 rpm for 10 minutes;

5) removing the artificially soiled fabric from the pot and squeezing water of the cloth by hand; putting hard water 1000 mL in the pot and the dewatered artificially soiled fabric in the pot and stirring at 100 rpm for 2 minutes;

6) removing the artificially soiled fabric from the pot and after squeezing water of the cloth by hand, drying the artificially soiled fabric ironing through another cloth while being smoothed and measuring the whiteness degree of the dried artificially soiled fabric based on the reflectance by a colorimetric color-difference meter; and 7) determining the detergency ratio (%) from the results according to the following formula:

Detergency ratio(%)=(whiteness degree of the artificially soiled fabric after cleaning−whiteness degree of the artificially soiled fabric before cleaning)/(whiteness degree of the original white cloth of the artificially soiled fabric−whiteness degree of the artificially soiled fabric−whiteness degree of the artificially soiled fabric before cleaning)×100.

3. The detergent composition according to claim 1, wherein the copolymer is composed of 20 to 95% by weight of the polyalkyleneimine unsaturated monomer and 5 to 80% by weight of other monomers.

4. The detergent composition according to claim 1, wherein the copolymer is produced by the copolymerization using a persulfate and a bisulfite as a polymerization initiator.

5. The detergent composition according to claim 4, wherein the copolymer is obtained by copolymerization proceeded under the condition that pH is 1 to 6 at 25° C. of the reaction solution during the polymerization.

6. The detergent composition according to claim 1, which is a liquid detergent composition.

7. The detergent composition according to claim 6, wherein the liquid detergent composition have kaolin turbidity 200 mg/L or less as determined by the following method:

dissolving 5% by weight of the copolymer in a liquid solvent 100% by weight; stirring components in the composition to be even and charging each sample in a 50 mm-square cell with a thickness of 10 mm, and after defoaming measuring the turbidity at 25° C.

8. The detergent composition according to claim 1 which consists essentially of said usual detergent additives and said detergent builder.

9. The detergent composition according to claim 2 which consists essentially of said usual detergent additives and said detergent builder.

10. The detergent composition according to claim 3 which consists essentially of said usual detergent additives and said detergent builder.

11. The detergent composition according to claim 4 which consists essentially of said usual detergent additives and said detergent builder.

12. The detergent composition according to claim 5 which consists essentially of said usual detergent additives and said detergent builder.

13. The detergent composition according to claim 6 which consists essentially of said usual detergent additives and said detergent builder.

14. The detergent composition according to claim 7 which consists essentially of said usual detergent additives and said detergent builder.

* * * * *

UNITED STATES PATENT AND TRADEMARK OFFICE
CERTIFICATE OF CORRECTION

PATENT NO. : 7,393,821 B2  Page 1 of 1
APPLICATION NO. : 10/962545
DATED : July 1, 2008
INVENTOR(S) : Atsuro Yoneda et al.

It is certified that error appears in the above-identified patent and that said Letters Patent is hereby corrected as shown below:

In the Claims:

Claim 2, column 24, line 42, should read --or a detergent of not less than 69.6% in the case of using-- in lieu of "or a detergent is not less than 69.6% in the case of using";

Claim 2, column 24, line 61, should read --27° C-- in lieu of "27° C.";

Claim 2, column 24, line 65, should read --0.28%-- in lieu of "0.280%";

Claim 2, column 25, line 8, should read --anti-redeposition-- in lieu of "anti-redespostion";

Claim 2, column 25, line 13, should read --or a detergency ratio of not less than 24.3% as determined-- in lieu of "or a detergency ratio if not less than 24.3% as determined";

Claim 2, column 25, line 25, should read --0.9%-- in lieu of "0.9g";

Claim 2, column 25, line 31, should read --27° C-- in lieu of "27° C.";

Claim 2, column 26, lines 2-3, "-whiteness-degree of the artificially soiled fabric" should be deleted; and Claim 5, column 26, line 3, should read --27° C-- in lieu of "27° C.".

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 7,393,821 B2
APPLICATION NO. : 10/962545
DATED : July 1, 2008
INVENTOR(S) : Atsuro Yoneda et al.

It is certified that error appears in the above-identified patent and that said Letters Patent is hereby corrected as shown below:

In the Claims:

Claim 2, column 24, line 42, should read --or a detergent of not less than 69.6% in the case of using-- in lieu of "or a detergent is not less than 69.6% in the case of using";

Claim 2, column 24, line 61, should read --27° C-- in lieu of "27° C.";

Claim 2, column 24, line 65, should read --0.28%-- in lieu of "0.280%";

Claim 2, column 25, line 8, should read --anti-redeposition-- in lieu of "anti-redespostion";

Claim 2, column 25, line 13, should read --or a detergency ratio of not less than 24.3% as determined-- in lieu of "or a detergency ratio if not less than 24.3% as determined";

Claim 2, column 25, line 25, should read --0.9%-- in lieu of "0.9g";

Claim 2, column 25, line 31, should read --27° C-- in lieu of "27° C.";

Claim 2, column 26, lines 2-3, "-whiteness-degree of the artificially soiled fabric" should be deleted; and

UNITED STATES PATENT AND TRADEMARK OFFICE
CERTIFICATE OF CORRECTION

| | |
|---|---|
| PATENT NO. | : 7,393,821 B2 |
| APPLICATION NO. | : 10/962545 |
| DATED | : July 1, 2008 |
| INVENTOR(S) | : Atsuro Yoneda et al. |

It is certified that error appears in the above-identified patent and that said Letters Patent is hereby corrected as shown below:

Claim 5, column 26, line 16, should read --27° C-- in lieu of "27° C.".

This certificate supersedes the Certificate of Correction issued January 6, 2009.

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,393,821 B2
APPLICATION NO. : 10/962545
DATED : July 1, 2008
INVENTOR(S) : Atsuro Yoneda et al.

It is certified that error appears in the above-identified patent and that said Letters Patent is hereby corrected as shown below:

In the Claims:

Claim 2, column 24, line 42, should read --or a detergent of not less than 69.6% in the case of using-- in lieu of "or a detergent is not less than 69.6% in the case of using";

Claim 2, column 24, line 61, should read --27° C-- in lieu of "27° C.";

Claim 2, column 24, line 65, should read --0.28%-- in lieu of "0.280%";

Claim 2, column 25, line 8, should read --anti-redeposition-- in lieu of "anti-redespostion";

Claim 2, column 25, line 13, should read --or a detergency ratio of not less than 24.3% as determined-- in lieu of "or a detergency ratio if not less than 24.3% as determined";

Claim 2, column 25, line 25, should read --0.9 g-- in lieu of "0.9g";

Claim 2, column 25, line 31, should read --27° C-- in lieu of "27° C.";

Claim 2, column 26, lines 2-3, "-whiteness-degree of the artificially soiled fabric" should be deleted; and

UNITED STATES PATENT AND TRADEMARK OFFICE
CERTIFICATE OF CORRECTION

PATENT NO.       : 7,393,821 B2
APPLICATION NO.  : 10/962545
DATED            : July 1, 2008
INVENTOR(S)      : Atsuro Yoneda et al.

It is certified that error appears in the above-identified patent and that said Letters Patent is hereby corrected as shown below:

Claim 5, column 26, line 16, should read --27° C-- in lieu of "27° C.".

This certificate supersedes the Certificates of Correction issued January 6, 2009 and February 3, 2009.

Signed and Sealed this

Seventeenth Day of March, 2009

JOHN DOLL
*Acting Director of the United States Patent and Trademark Office*